(12) United States Patent
Gunawan

(10) Patent No.: US 11,304,532 B2
(45) Date of Patent: Apr. 19, 2022

(54) TOOL-FREE KNOCKDOWNABLE SOFA

(71) Applicant: Dedy Gunawan, Bandung (ID)

(72) Inventor: Dedy Gunawan, Bandung (ID)

( * ) Notice: Subject to any disclaimer, the term of this patent is extended or adjusted under 35 U.S.C. 154(b) by 0 days.

(21) Appl. No.: 17/147,716

(22) Filed: Jan. 13, 2021

(65) Prior Publication Data

US 2022/0087429 A1 Mar. 24, 2022

(30) Foreign Application Priority Data

Sep. 24, 2020 (ID) .............................. S00202006992

(51) Int. Cl.
| | | |
|---|---|---|
| *A47C 5/10* | (2006.01) | |
| *F16B 12/30* | (2006.01) | |
| *A47C 17/02* | (2006.01) | |
| *A47C 5/06* | (2006.01) | |
| *A47C 4/02* | (2006.01) | |
| *F16B 12/10* | (2006.01) | |

(52) U.S. Cl.
CPC ............... *A47C 5/10* (2013.01); *A47C 4/028* (2013.01); *A47C 5/06* (2013.01); *A47C 17/02* (2013.01); *F16B 12/30* (2013.01); *F16B 2012/106* (2013.01)

(58) Field of Classification Search
CPC .. A47C 17/02; A47C 5/06; A47C 4/02; A47C 7/00; A47C 5/10; A47C 4/028; F16B 12/30; F16B 2012/106
USPC .... 297/440.1, 452.18, 218.1, 440.14, 440.15
See application file for complete search history.

(56) References Cited

U.S. PATENT DOCUMENTS

| | | | | |
|---|---|---|---|---|
| 3,248,147 A | * | 4/1966 | Testa | A47C 31/11 297/218.1 |
| 5,795,028 A | * | 8/1998 | Dussia, Jr. | A47C 13/005 248/220.1 |
| 6,412,745 B1 | * | 7/2002 | Yokoyama | A47B 95/00 248/247 |
| 9,149,124 B1 | * | 10/2015 | Savovic | A47C 7/24 |
| 9,474,381 B2 | * | 10/2016 | Brandtner | A47C 4/028 |
| 9,668,581 B1 | | 6/2017 | Hill | |
| 2005/0225153 A1 | * | 10/2005 | Ou | A47C 17/00 297/440.1 |
| 2012/0019038 A1 | * | 1/2012 | Mezzera | A47C 7/02 297/440.15 |
| 2012/0242200 A1 | * | 9/2012 | Keragala | F16B 12/14 312/111 |
| 2017/0071354 A1 | * | 3/2017 | Mezzera | A47C 13/005 |

FOREIGN PATENT DOCUMENTS

JP 2020-044107 A 3/2020

* cited by examiner

*Primary Examiner* — Milton Nelson, Jr.
(74) *Attorney, Agent, or Firm* — Manabu Kanesaka

(57) ABSTRACT

A sofa can be knock-downed without a tool. The sofa includes left and right armrests, a front frame, a seating and a back. The sofa is provided with stowage compartments, each of which is joined by a bolt hole plate located on the frame construction with a bolt connecting medium, and serving as sofa stabilizers are four sofa legs which are placed on at the bottom of the left and right arm frame construction of the sofa.

5 Claims, 3 Drawing Sheets

TOOL-FREE KNOCKDOWNABLE SOFA

RELATED APPLICATIONS

The present application is based on, and claims priority from, Indonesian Utility Model Application No. S00202006992 filed Sep. 24, 2020, the disclosure of which is hereby incorporated by reference herein in its entirety.

TECHNICAL ASPECTS OF THE INVENTION

This invention relates to a tool-free knockdownable sofa; more specifically, this invention relates to a sofa which can be assembled and disassembled only manually, without the aid of tools, making it more practical and easy to transport.

BACKGROUND OF THE INVENTION

As it is well known, a sofa is a piece of household furniture relying on the comfort which is used as a complement to the house which is always placed in the living room; a sofa is a special household furniture capable of drawing the guests' attention.

A sofa can be used as a more relaxed seat since it has armrests and a back with all sides covered by foam and wrapped in a soft cloth, making sitting on it more comfortable.

A sofa generally consists of three seating, two seating and single seating. The strength of a sofa depends on its construction, quality foam and springs; these materials serve to form a sofa consisting of a back, seating and armrests which are part of the beauty of the sofa design, making it comfortable to sit on it.

As it is known, existing sofas remain having problems and limitations, including, those sofas are generally not knockdownable, being factory-assembled in a permanently-built condition, which cannot be knocked down. One has to use tools to disassemble the parts of the sofa, which can be done by those with special skills to disassemble and re-assemble the sofa. Furthermore, those sofas have a large volume, leading to such obstacles as packaging and more expensive shipping costs.

With the problems described above, the inventor observes and provides a solution by improving the existing sofas through an invention entitled "A Tool-free Knockdownable Sofa" which is designed in such a way that the sofa resulting from this invention is more practical and easy to carry, pack, and ship since it can be assembled and disassembled and re-assembled without the use of tools.

BRIEF DESCRIPTION OF THE INVENTION

The purpose of this invention is to provide a tool-free knockdownable sofa, where the sofa resulting from this invention has improvements over the existing sofas.

To achieve the purpose, the sofa resulting from this invention has a reliable construction due to its strength and excellent quality raw materials, so that the sofa resulting from this invention can be practically assembled and disassembled and re-assembled without the use of tools.

The purpose of this invention is to provide a tool-free knockdownable sofa consisting of the left and right armrests of the sofa, the front frame of the sofa, the seating of the sofa and the back of the sofa, which provides stowage compartments, each of which is combined through bolt hole plates located on the frame construction by the sakura bolt connecting media; and serving as the sofa stabilizers are four sofa legs which are placed at the bottom of the left and right frame construction; the connecting medium for the sofa construction is six sakura bolts that can be rotated to secure the construction connection; the bolt hole plates located on the frame construction of the sofa also serve as the nuts for the sakura bolts; the entire frame of the sofa construction is made of stainless galvanized hollow iron; the top of the four legs of the sofa has a fine threads of ½ inch and 60 mm in length and the bottom preferably made of plastic of 15 cm length with a bottom diameter of 4 cm and an upper diameter of 5.5 cm; the rear of the back of the sofa can be opened and closed, preferably with a zipper or a pin, there is a frame construction beam joined to the left and right arms of the sofa by the sakura bolt serving as the connecting medium; behind it on the left and right sides of the frame construction beam there is a bolt hole plate as the place for the sakura bolts which serve as the connecting medium; the front of the sofa seating is supplemented by an iron elbow of 178.6×58.5 cm; the construction of the top and bottom of the left and right armrest has dual frames, that is, two frames combined into one; the entire construction of the sofa is covered by foam, Dacron and wrapping cloth; the assembly of the sofa is done manually without using tools.

Another purpose of this invention is to provide a tool-free knockdownable sofa by using quality raw materials and appropriate technology which is produced domestically.

Other purposes and benefits as well as a more complete understanding of the following invention as a preferred embodiment will be explained in the accompanying figures of the invention.

BRIEF DESCRIPTION OF THE FIGURES

This invention will be further described by including several illustrative embodiments which are not intended to limit the present invention, and are only used to facilitate understanding of the present invention, where.

COMPLETE DESCRIPTION OF THE INVENTION

Figure 1:
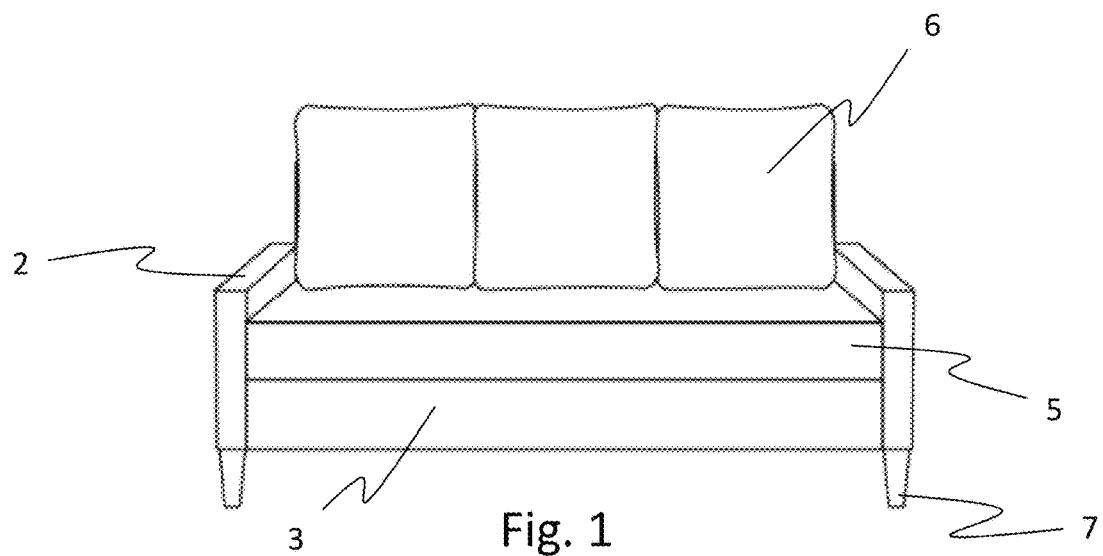
FIG. 1 shows the front-view drawing of an embodiment of the tool-free knockdownable sofa in accordance with the present invention.
Figure 2:
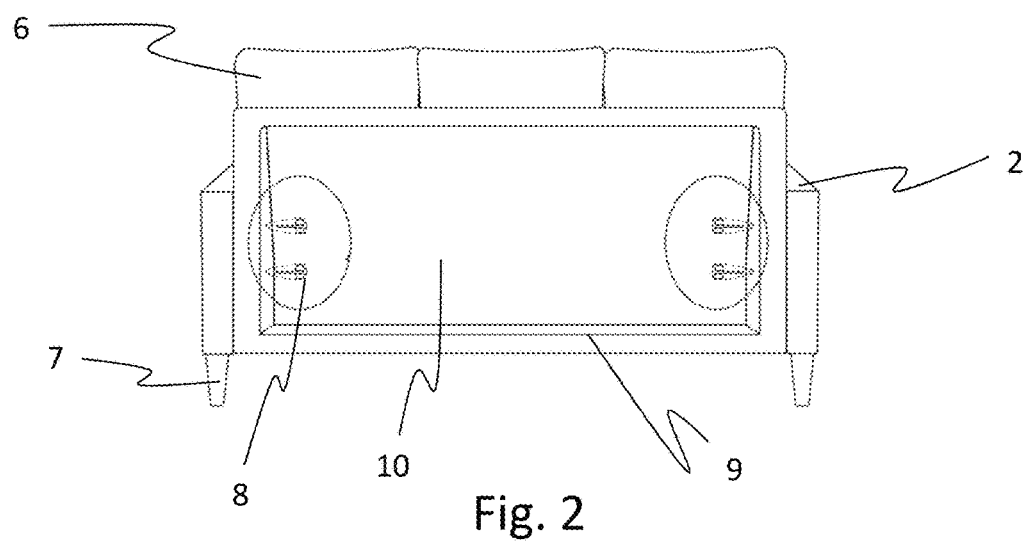
FIG. 2 shows the rear-view drawing of a sakura bolt serving as the connecting medium of the tool-free knockdownable sofa according to the present invention.
Figure 3:
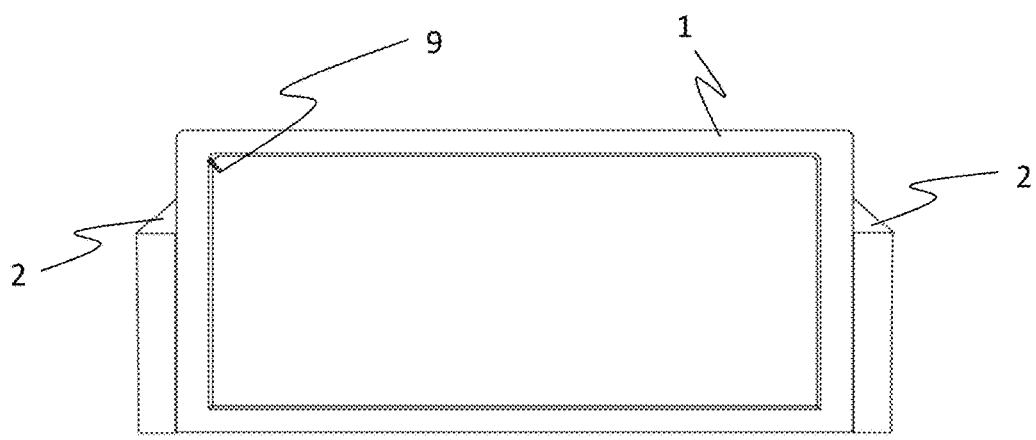
FIG. 3 shows the rear-view drawing of a legless and closed backrest preferably with zippers of the tool-free knockdownable sofa according to the present invention.
Figures 4, 5:
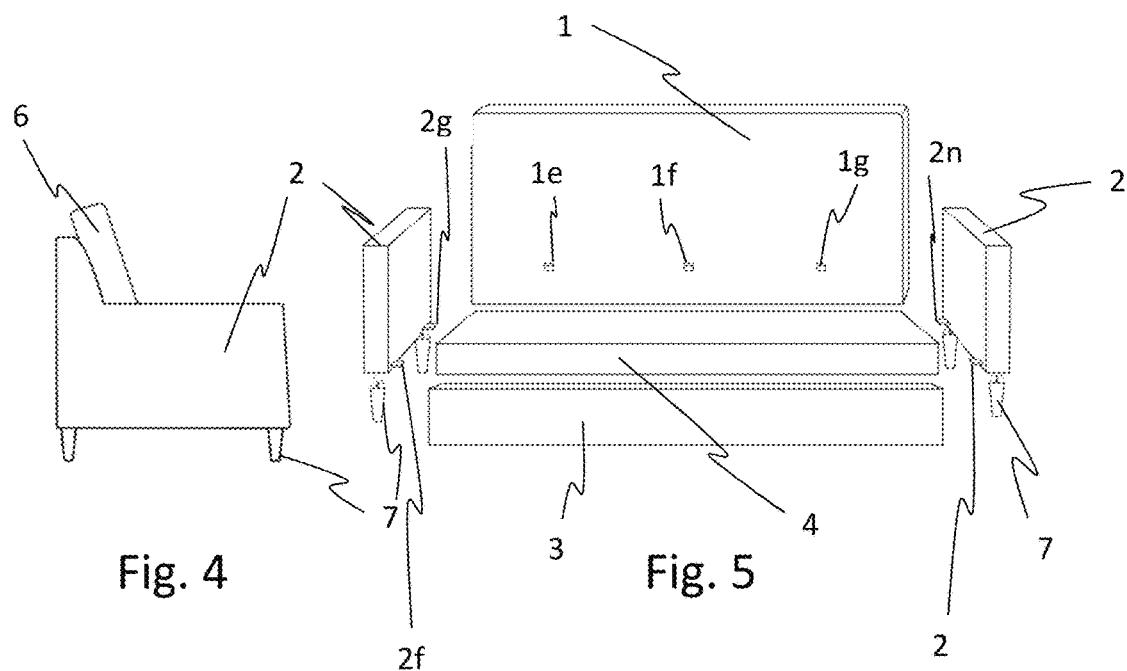
FIG. 4 shows a side view of the tool-free knockdownable sofa in accordance with the present invention.
FIG. 5 shows front-view detached drawings of the tool-free knockdownable sofa in accordance with the present invention.

The present invention will be described in full by reference to the accompanying drawings.

It should be understood, however, that the present invention, without intention of limiting parts, arrangements and similar materials of manufacture not specifically described, and changes in materials, variations, sizes and modifications, can be made without deviating the basics and scope described in this invention.

With regard to the illustrative drawing included in this description, the present invention will be described. The understanding of a tool-free knockdownable sofa in accordance with the present invention is not limited to the shape of the sofa, and the sofa of the present invention can be made of various other embodiments and can also be made up of three seating, two seating and single seating in all their embodiments.

FIGS. 1 to 9 show all the components of the tool-free knockdownable sofa according to the present invention. These components include backrest of the sofa (1), arms of the sofa (2), front frame of the sofa (3), seating of the sofa (4), seating cushion of the sofa (5), backrest cushion of the sofa (6), leg of the sofa (7), sakura bolts (8) and zippers (9) as well as Velcro tape and stowage compartments (10).

FIGS. 1 to 5 are drawings that shows the final result of the sofa product according to the invention as shown in FIG. 1. The sofa is wrapped in quality cloth and the sofa preferably consists of three backrest cushions (6) which are placed on the seating cushions (5) and resting on the backrest of the sofa (1), on the left and right sides of the sofa there is a sofa arm (3) which connects to the front frame of the sofa (3) on the front and on the back to the backrest of the sofa (1), the sofa has four legs (7) to support and stabilize the sofa. At the back of the sofa, there are stowage compartments (10) which can be opened and closed preferably with a zipper (9) or Velcro tape (not shown in the drawing) and on the inside of the stowage compartments (10) there are four sakura bolts (8) which serve as a medium to connect the arms of the sofa (2) to the backrest of the sofa (1).

Furthermore FIGS. 6 to 9 show the entire frame construction of the sofa, sakura bolts (8) and sofa legs (7) in accordance with this invention where the entire sofa frame construction is made of stainless galvanized hollow iron, each of the sofa frame construction being connected by the welding process. The sofa frame construction in accordance with this invention consists of the left-hand frame construction (2) and the right-hand frame construction (2), each of which is made using a double frame, that is, the left and right sides as well as the top and bottom, respectively, has double frames.

The left arm frame construction (2) consists of plates for placing fastening bolts, namely sakura bolts (8), where all plates in the frame construction of the sofa according to this invention directly serve as the nuts of the sakura bolts (8). The left arm frame construction (2) has a bolt hole plate (2a) on the front and bolt hole plates (2b) and (2c) on the back and the bolt hole plates are fixed to the inner arm frame construction (2). The arm frame construction (2) is provided with the sofa leg bolt hole plate (2d) on the front bottom and (2e) on the rear bottom where the sofa leg bolt hole plates (2d) and (2e) are used to place the sofa legs (7). The arm frame construction (2) is provided with a supporting elbow plate (2f) on the bottom front which serves to support the front frame of the sofa (3) and the supporting elbow plate (2g) on the rear bottom which serves to support the sofa backrest (1).

Referring to the frame construction, the right arm frame construction (2) is in principle the same as the left arm frame construction (2), the difference being in the reference numbers of the drawing, where the right arm frame construction (2) has a bolt hole plate (2h) on the front and the bolt hole plates (2i) and (2j) on the rear and the bolt hole plates are fixed to the inner arm frame construction (2). The arm frame construction (2) is provided with the sofa leg bolt hole plate (2k) on the front bottom and (2l) on the rear bottom where the sofa leg bolt hole plates (2k) and (2l) are used to place the sofa legs (7). The arm frame construction (2) is provided with a supporting elbow plate (2m) on the front bottom which serves to support the front bottom frame of the sofa (3) and a supporting elbow plate (2n) on the rear bottom which serves to support the backrest of the sofa (1).

The front frame construction of the sofa (3) has a bolt hole plate (3a) on the left side and a bolt hole plate (3b) on the right side; the top of the sofa front frame construction (3) is provided with a supporting elbow (3c) on the left side and a supporting elbow (3d) on the right side, while the front frame construction of the sofa (3) is provided with a supporting plate (3e) right in the middle which is specially shaped where the inner end is provided with an elongated hole which serves to insert a protrusion (4a) in the seating frame construction the sofa (4).

The backrest frame construction of the sofa (1) has bolt hole plates (1a), (1b) on the left side and bolt hole plates (1c), (1d) on the right side; the bolt hole plates are placed on the rear backrest frame construction beam of the sofa (1); the middle of the sofa backrest frame construction (1) is provided with a supporting elbow (1f) on the left side and a supporting elbow (1g) on the right side and a supporting plate is provided (1e) right in the middle which serves to support the seating frame construction of the sofa (4).

The front towards the rear of the seating frame construction of the sofa (4) is provided with a spiral wire, while the left towards right sides of the sofa seating frame construction (4) is provided a spiral wire webbing and the webbing placed on the seating frame construction of the sofa (4) serves to provide comfort when seating on the sofa resulting from this invention.

Figures 7, 8, 9:
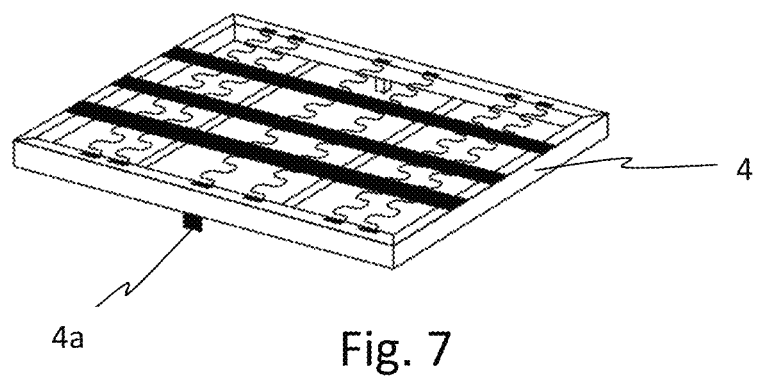
FIG. 7 shows a perspective view of the seating frame construction of the tool-free knockdownable sofa according to the present invention.
FIG. 8 shows a side view of a sakura bolt serving as a connecting medium of the tool-free knockdownable sofa in accordance with the present invention.
FIG. 9 shows a side view drawing of the leg of the tool-free knockdownable sofa according to the invention.

Furthermore, to assemble all the sofa frame constructions, sakura bolts (8) are used as the connecting media where the bolts are designed in such a way as to have a round head and have recesses (as shown in FIG. 8) so that they can be easily held and rotated by hand. Meanwhile, serving as the balancer of the sofa, four sofa legs are provided (7) which are made of plastic of 15 cm in length, the diameter of the bottom of the sofa legs (7) is 4 cm and the top diameter is 5.5 cm, bolts are provided right at the top center (11), measuring ½ inch and 60 mm in length which has fine threads (as shown in FIG. 9).

Figure 6:
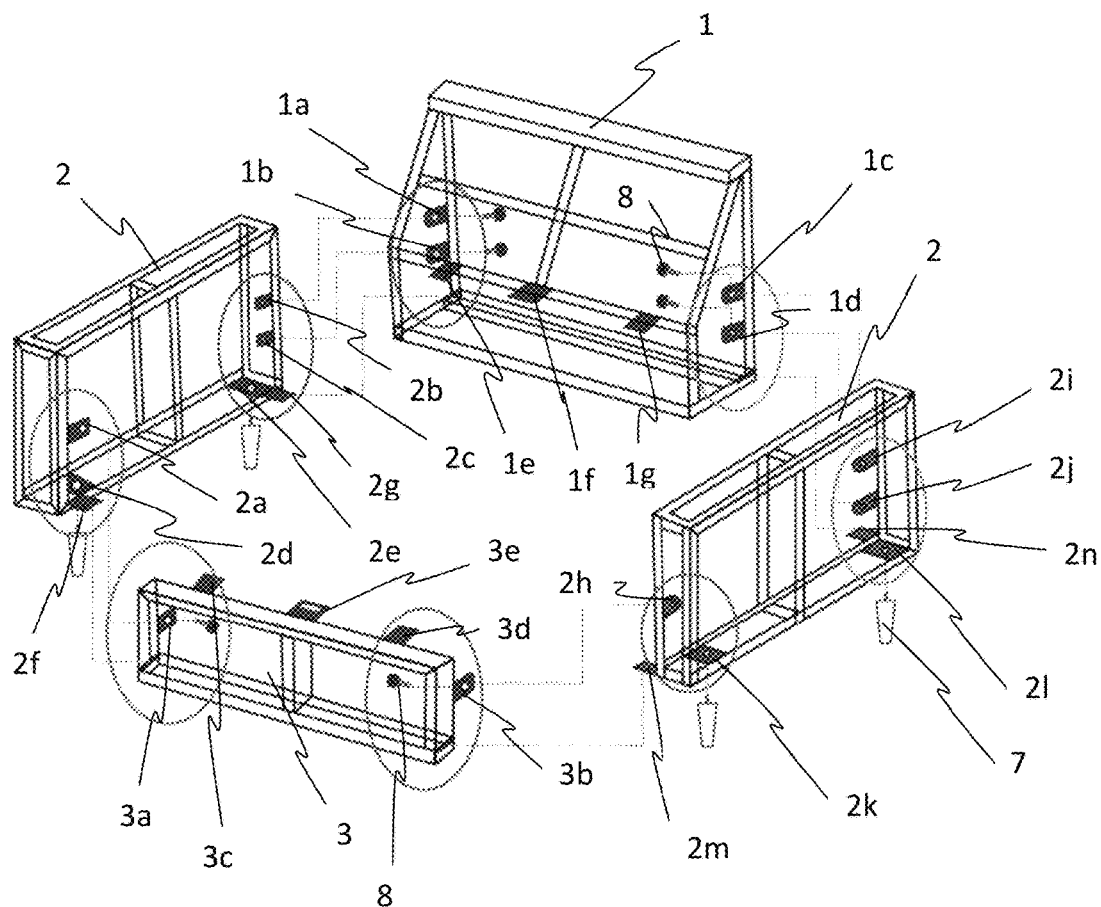
FIG. 6 shows perspective-view detached drawings of the frame construction of the tool-free knockdownable sofa according to the present invention.

The feature of this invention is to provide a tool-free knockdownable sofa in which the sofa resulting from this invention can be easily assembled only by hand. The assembly process is very easy, where the arm frame of the sofa (2) on the left and the right side will be joined with the front frame of the sofa (3) and the backrest of the sofa (1) (as shown in FIG. 6), where the arm frame of the sofa (2) on the left side is joined to the front frame of the sofa (3) via the bolt hole plate (2a) with the bolt hole plate (3a) while the arm frame of the sofa (2) on the right side is joined via the bolt hole plate (2h) with the bolt hole plate (3b); the joining is carried out with a connecting medium in the form of a sakura bolt (8) which rotated clockwise to tighten it, the supporting elbows (2f) and (2m) serve to support the front frame of the sofa (3). Furthermore, the backrest frame of the sofa (1) is joined to the arm frame of the sofa (2) on the left side through the bolt hole plate (2b) which is joined with the bolt hole plate (1a) and the bolt hole plate (2c) with the bolt hole plate (1b) and the arm frame of the sofa (2) on the right side through the bolt hole plate (2i) is joined with the bolt hole plate (1c) and the bolt hole plate (2j) with the bolt hole plate (1d), and then tightened with sakura bolts (8) and the supporting elbow (2g) and the supporting elbows (2n) will support the wall frame of the sofa (1). Upon assembly of each frame construction of the sofa, the leg of the sofa (7) is installed where the sofa leg bolt (11) will be fixed to each leg bolt holes of the sofa (2d), (2e), (2k) and (2l), thus the frame construction of the sofa has been assembled; furthermore, the seating frame of the sofa (4) is installed, which has a protrusion (4a) which will be inserted into the supporting elbow hole (3e) which aims to ensure that the seating of the (4) is locked and cannot move the supporting elbows (3c) and (3d) are on the front frame of the sofa (3) and the supporting elbows (1f), (1e) and (1g) which are on the backrest frame of the sofa (1) serve to support seating of the sofa (4).

The description above clearly shows that this invention has a special feature and also improves the existing sofas, and this invention can be knocked down practically and can be used as a sofa with comfort when used for all its purposes.

Accordingly, this invention is described with regard to the illustrative figures which are included in this description. Various forms of modification and variations to this invention may be performed by a person who is skilled in the technical aspect of this invention without deviating the basics of this invention. Further, patent protection is applied for this invention as disclosed in the following claims.

The invention claimed is:

1. A tool-free knockdownable sofa comprising:
   a rectangular left armrest having front, back, upper and lower portions connected together, and including a bolt hole plate attached to the front portion, two bolt hole plates formed on the back portion to be spaced apart from each other, two bolt hole plates spaced apart from each other at a bottom of the lower portion, and two supporting elbow plates formed on the lower portion to be spaced apart from each other and projecting outwardly therefrom,
   a rectangular right armrest having front, back, upper and lower portions connected together, and including a bolt hole plate attached to the front portion of the right armrest, two bolt hole plates formed on the back portion of the right armrest to be spaced apart from each other, two bolt hole plates spaced apart from each other at a bottom of the lower portion of the right armrest, and two supporting elbow plates formed on the lower portion of the right armrest to be spaced apart from each other and projecting outwardly therefrom,
   a front frame having left, right, upper and lower portions connected together in an elongated rectangular shape, and including a left bolt hole plate attached on the left portion of the front frame, a right bolt hole plate attached on the right portion of the front frame, and three supporting elbow plates spaced apart from each other and attached on the upper portion of the front frame,
   a back frame having a left portion with two bolt hole plates spaced apart from each other, a right portion with two bolt hole plates spaced apart from each other, and a lower portion with three supporting elbow plates spaced apart from each other located between the left and right portions of the back frame,
   sofa legs attached to the bolt hole plates at the bottoms of the left and right armrests,
   bolts wherein the bolt hole plates attached to the front portions of the left and right armrests are aligned with the left and right bolt hole plates of the front frame and connected together by the bolts, and the bolt hole plates attached to the back portions of the left and right armrests are aligned with the bolt hole plates of the left and right portions of the back frame and connected together by the bolts, and
   a sofa seating disposed on the supporting elbow plates of the left and right armrests and the front and back frames.

2. A tool-free knockdownable sofa according to claim 1, wherein a rear of the back frame of the sofa can be opened and closed with a zipper or a pin.

3. A tool-free knockdownable sofa according to claim 1, wherein the upper and lower portions of the left and right armrest have dual frames including two frames combined into one.

4. A tool-free knockdownable sofa according to claim 1, wherein the entire frame of the sofa construction is made of stainless galvanized hollow iron.

5. A tool-free knockdownable sofa according to claim 1, wherein a top of four legs of the sofa has a fine thread of ½ inch and 60 mm in length and made of plastic of 15 cm in length with 4 cm in lower diameter and 5.5 cm in upper diameter.

* * * * *